(12) United States Patent
Nakata

(10) Patent No.: US 7,094,375 B2
(45) Date of Patent: Aug. 22, 2006

(54) METHOD FOR PRODUCING A WINDOW GLASS FOR A VEHICLE PROVIDED WITH AN ORNAMENTAL BRAID

(75) Inventor: Osamu Nakata, Matsuzaka (JP)

(73) Assignee: Central Glass Company, Limited, Ube (JP)

(*) Notice: Subject to any disclaimer, the term of this patent is extended or adjusted under 35 U.S.C. 154(b) by 232 days.

(21) Appl. No.: 10/740,547

(22) Filed: Dec. 22, 2003

(65) Prior Publication Data

US 2004/0131802 A1 Jul. 8, 2004

(30) Foreign Application Priority Data

Dec. 24, 2002 (JP) ............... 2002-372839

(51) Int. Cl.
*B29C 45/14* (2006.01)
*B60J 1/00* (2006.01)

(52) U.S. Cl. .............. 264/261; 264/263; 264/274; 264/275

(58) Field of Classification Search .......... 264/252, 264/274, 275, 263, 261, 277, 279
See application file for complete search history.

(56) References Cited

U.S. PATENT DOCUMENTS

| | | | | |
|---|---|---|---|---|
| 3,843,982 A | * | 10/1974 | Lane et al. ............... 114/361 |
| 4,174,245 A | * | 11/1979 | Martineau ................ 156/245 |
| 4,723,809 A | * | 2/1988 | Kida et al. ............ 296/96.21 |
| 4,894,972 A | | 1/1990 | Endoh et al. |
| 5,158,638 A | * | 10/1992 | Osanami et al. .......... 156/245 |
| 5,707,473 A | * | 1/1998 | Agrawal et al. ........... 156/245 |
| 6,120,274 A | * | 9/2000 | Gerig et al. ................ 425/116 |
| 6,495,082 B1 | * | 12/2002 | Ash et al. .................. 264/240 |

FOREIGN PATENT DOCUMENTS

| | | |
|---|---|---|
| JP | 59-57730 A2 | 4/1984 |
| JP | 63 297009 A | 12/1988 |
| JP | 3019817 A | 1/1991 |
| JP | 5-84770 A2 | 4/1993 |
| JP | 6-72144 A2 | 3/1994 |
| JP | 6071693 A | 3/1994 |
| JP | 6072144 | 3/1994 |

OTHER PUBLICATIONS

European Search Reported, completed Apr. 7, 2004.
Partial English Translation of Japanese Patent Laid-Open Publication No. 6-72144, published Mar. 15, 1994.
Partial English Translation of Japanese Patent Laid-Open Publication No. 59-57730, published Apr. 3, 1984.
Partial English Translation of Japanese Patent Laid-Open Publication No. 5-84770, published Apr. 6, 1993.

* cited by examiner

*Primary Examiner*—Jill L. Heitbrink
(74) *Attorney, Agent, or Firm*—Griffin & Szipl, P.C.

(57) ABSTRACT

A method for producing a window glass for a vehicle provided with an ornamental braid comprises steps of setting an ornamental braid on a lower mold of an injection molding machine, fixing an ornamental braid connection member on the lower mold, setting a glass plate on the lower mold, closing an upper mold, thereby locking the molds, and injecting molten resin into a cavity formed between the lower mold and the upper mold, thereby integrally molding a resin frame, the ornamental braid and the ornamental braid connection member along a periphery of the glass plate.

7 Claims, 3 Drawing Sheets

METHOD FOR PRODUCING A WINDOW GLASS FOR A VEHICLE PROVIDED WITH AN ORNAMENTAL BRAID

This application claims priority from Japanese Patent Application No. 2002-372839, filed Dec. 24, 2002, the entire disclosure of which is incorporated herein by reference.

BACKGROUND OF THE INVENTION

The present invention relates to a method for producing a window glass for a vehicle provided with an ornamental braid and a window glass for a vehicle provided with an ornamental braid.

A method for producing a window glass for a vehicle provided with an ornamental braid is disclosed in Japanese Patent Laid-Open Publication No.6-72144. The method comprises steps of setting an ornamental braid, a spacer and a glass plate on a lower mold of an injection molding machine in the order of the ornamental braid, the spacer and the glass plate, closing an upper mold to lock the molds, and injecting molten resin into a cavity formed between the upper mold and the lower mold with the ornamental braid pressed against the lower mold by the spacer, thereby integrally molding a resin frame and the ornamental braid along the periphery of the glass plate.

Methods for producing a molded resin article are disclosed in Japanese Patent Laid-Open Publications No.59-57730 and 5-84770. The methods comprise steps of setting an ornamental braid on a lower mold of an injection molding machine, closing an upper mold provided with pins, thereby locking the molds, and injecting molten resin into a cavity formed between the upper mold and the lower mold with the ornamental braid pressed against the lower mold by the pins, thereby integrally molding a molded resin article and the ornamental braid.

When a window glass for a vehicle provided with an ornamental braid is mounted on a vehicle body, the ornamental braid of the window glass should be aligned with an ornamental braid of an adjacent window glass or an ornamental braid of an adjacent part of the vehicle body. Displacement of the ornamental braid during injection of molten resin into the cavity formed between the lower mold and the upper mold can be prevented by the spacer of Japanese Patent Laid-Open Publication No.6-72144 or the pins of Japanese Patent Laid-Open Publications No.59-57730 and 5-84770. However, a slight displacement of the ornamental braid caused by shrink of the resin frame after mold opening cannot be prevented by the prior art methods. Therefore, the ornamental braid of the window glass mounted on the vehicle body cannot be aligned with the ornamental braid of the adjacent window glass or the ornamental braid of the adjacent part of the vehicle body. Thus, the appearance of the vehicle is degraded.

SUMMARY OF THE INVENTION

An object of the present invention is to provide a method for producing a window glass for a vehicle provided with an ornamental braid, wherein a resin frame and an ornamental braid are integrally molded along a periphery of a glass plate, which can produce a window glass for a vehicle provided with an ornamental braid adapted to align the ornamental braid with an ornamental braid of an adjacent window glass or an ornamental braid of an adjacent part of a vehicle body when it is mounted on a vehicle body.

Another object of the present invention is to provide a window glass for a vehicle provided with an ornamental braid adapted to align the ornamental braid with an ornamental braid of an adjacent window glass or an ornamental braid of an adjacent part of a vehicle body when it is mounted on a vehicle body.

In accordance with the present invention, there is provided a method for producing a window glass for a vehicle provided with an ornamental braid comprising steps of setting an ornamental braid on a lower mold of an injection molding machine, fixing an ornamental braid connection member on the lower mold, setting a glass plate on the lower mold, closing an upper mold, thereby locking the molds, and injecting molten resin into a cavity formed between the lower mold and the upper mold, thereby integrally molding a resin frame, the ornamental braid and the ornamental braid connection member along a periphery of the glass plate.

In accordance with a preferred embodiment of the present invention, the method further comprises a step of clamping the ornamental braid with the ornamental braid connection member and the lower mold, thereby fixing the ornamental braid on the lower mold.

In accordance with another preferred embodiment of the present invention, the method further comprises a step of clamping the ornamental braid with a plurality of projections formed on the ornamental braid connection member and the lower mold, thereby fixing the ornamental braid on the lower mold.

In accordance with another preferred embodiment of the present invention, the method further comprises a step of inserting a pin projecting from the lower mold into a hole formed in the ornamental braid connection member, thereby fixing the ornamental braid connection member on the lower mold.

In accordance with another preferred embodiment of the present invention, the method further comprises a step of engaging a plurality of projections formed on the ornamental braid connection member with a plurality of hollows formed on the lower mold, thereby fixing the ornamental braid connection member on the lower mold.

In accordance with another preferred embodiment of the present invention, the method further comprises a step of engaging a plurality of hollows formed on the ornamental braid connection member with a plurality of projections formed on the lower mold, thereby fixing the ornamental braid connection member on the lower mold.

In accordance with another preferred embodiment of the present invention, the ornamental braid connection member is provided with a hollow for engaging the resin frame.

In accordance with another aspect of the present invention, there is provided a window glass for a vehicle provided with an ornamental braid comprising a resin frame, an ornamental braid, an ornamental braid connection member and a glass plate, wherein the resin frame, the ornamental braid and the ornamental braid connection member are integrally molded along a periphery of the glass plate.

In accordance with a preferred embodiment of the present invention, a hollow formed in the ornamental braid connection member engages a projection formed on the resin frame.

DETAILED DESCRIPTION OF THE PREFERRED EMBODIMENTS

A method for producing a window glass for a vehicle provided with an ornamental braid in accordance with a first preferred embodiment of the present invention will be described in detail.

Figure 1A:
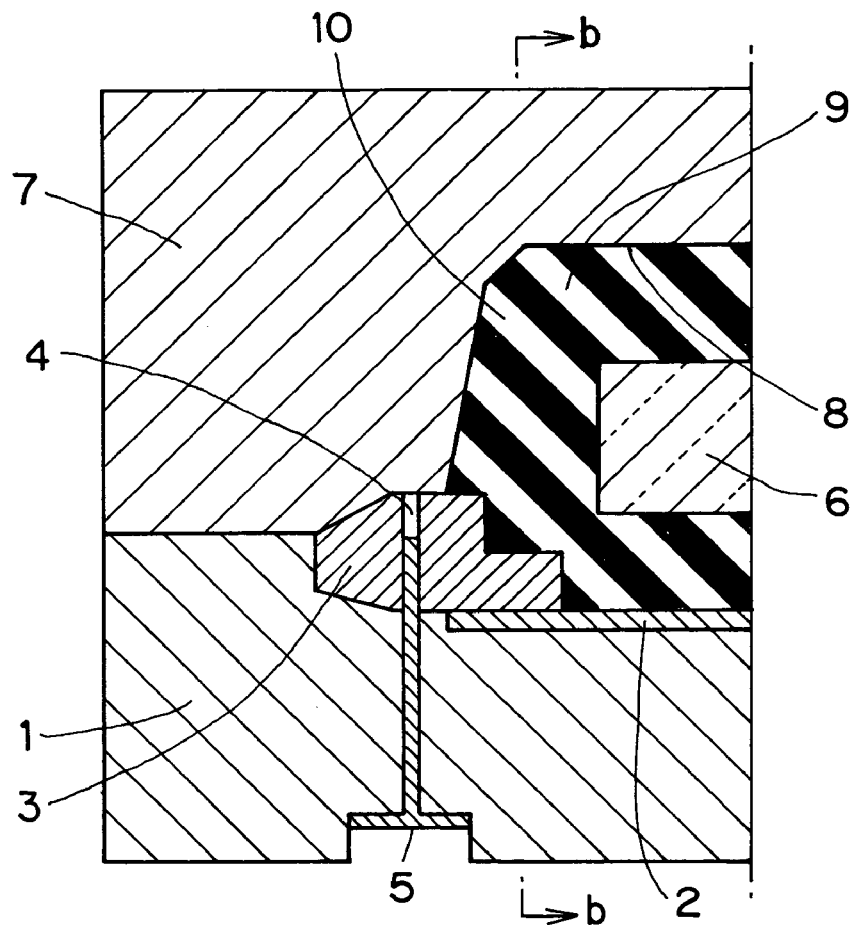
FIG. 1 is a sectional view of a mold of an injection molding machine for explaining a method for producing a window glass for a vehicle provided with an ornamental braid in accordance with a first preferred embodiment of the present invention in which (b) is a view in the direction of arrows b—b in (a), while (a) is a view in the direction of arrows a—a in (b).
Figure 1B:
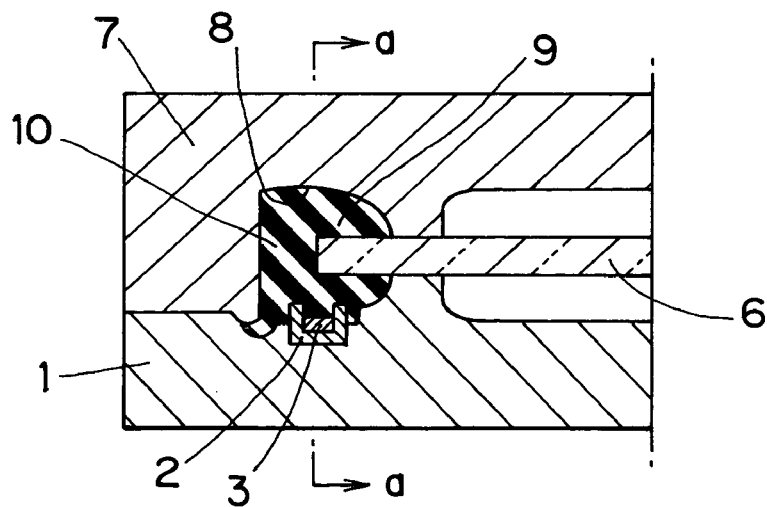

As shown in FIG. 1, an ornamental braid 2 with channel-shaped cross section is set on a lower mold 1 of an injection molding machine with the open end thereof directed upward. An ornamental braid connection member 3 of substantially rectangular parallelopiped shape is set on the lower mold 1 with one end portion thereof fitted in one end portion of the ornamental braid 2. A pin 5 is inserted in a hole formed in the lower mold 1 and a hole 4 formed in the ornamental braid connection member 3 to fix the ornamental braid connection member 3 on the lower mold 1 and clamp the ornamental braid 2 with the ornamental braid connection member 3 and the lower mold 1, thereby fixing the ornamental braid 2 on the lower mold 1. A glass plate 6 is positioned at a suitable distance from the ornamental braid 2 and the ornamental braid connection member 3, and set on the lower mold 1.

An upper mold 7 is closed to lock the molds, resin 9 is injected into a cavity 8 formed between the lower mold 1 and the upper mold 7, the molds are opened after hardening of the resin 9, and a molded resin article is taken out the molds.

Figure 2:
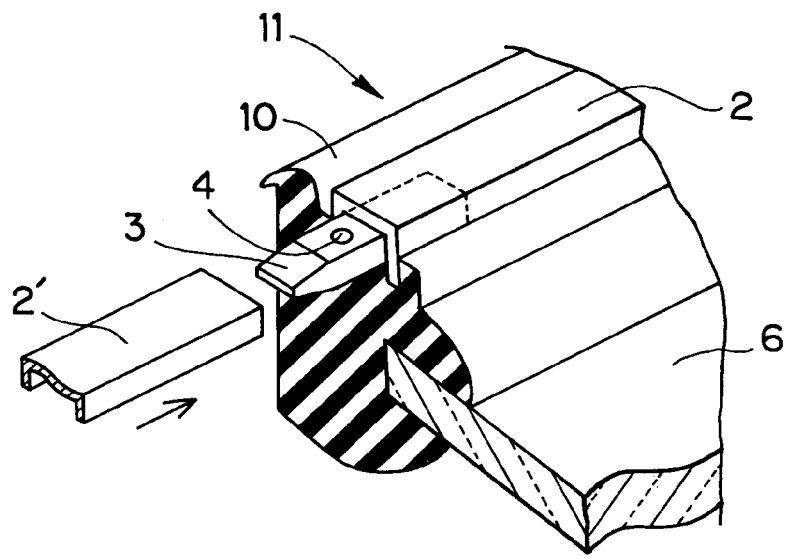
FIG. 2 is a perspective view of a window glass for a vehicle provided with an ornamental braid produced by the method in accordance with a first preferred embodiment of the present invention.

As shown in FIG. 2, the aforementioned method produces a window glass 11 for a vehicle provided with an ornamental braid. The window glass 11 is provided with a resin frame 10, the ornamental braid 2 and the ornamental braid connection member 3 integrally molded along a periphery of the glass plate 6.

As can be seen from FIG. 2, when the window glass 11 for a vehicle provided with an ornamental braid is mounted on a vehicle body not shown in FIG. 2, the ornamental braid connection member 3 partially projects from the end of the ornamental braid 2. The portion of the ornamental braid connection member 3 projecting from the end of the ornamental braid 2 is fitted into one end portion of an ornamental braid 2' of an adjacent window glass or an adjacent part of a vehicle body, thereby aligning and connecting the ornamental braid 2 with the ornamental braid 2'. Even if the ornamental braid 2 is slightly displaced due to shrink of the resin frame 10 after mold opening, the ornamental braid 2 can easily and surely be aligned with the ornamental braid 2' by fitting the portion of the ornamental braid connection member 3 projecting from the end of the ornamental braid 2 into the end portion of the ornamental braid 2' of the adjacent window glass or the adjacent part of the vehicle body. Alignment of the ornamental braid 2 with the ornamental braid 2' enhances the appearance of the vehicle.

Displacement of the ornamental braid 2 during injection of the molten resin 9 into the cavity 8 is prevented by clamping the ornamental braid 2 with the ornamental braid connection member 3 and the lower mold 1, thereby fixing the ornamental braid 2 on the lower mold 1.

Displacement of the ornamental braid connection member 3 during injection of the molten resin 9 into the cavity 8 is prevented by inserting the pin 5 in the hole formed in the lower mold 1 and the hole 4 formed in the ornamental braid connection member 3, thereby fixing the ornamental braid connection member 3 on the lower mold 1.

A method for producing a window glass for a vehicle provided with an ornamental braid in accordance with a second preferred embodiment of the present invention will be described.

Figure 3:
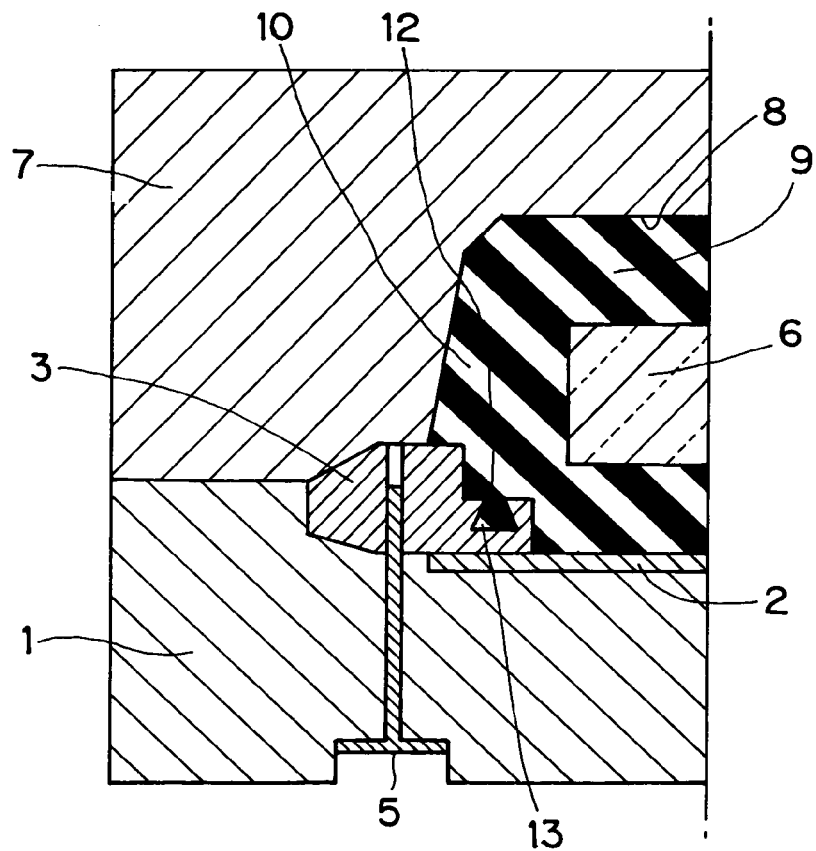
FIG. 3 is a sectional view of a mold of an injection molding machine for explaining a method for producing a window glass for a vehicle provided with an ornamental braid in accordance with a second preferred embodiment of the present invention.

As shown in FIG. 3, the ornamental braid connection member 3 is provided with a hollow 12 for engaging the resin frame 10. Except this feature, the method for producing a window glass for a vehicle provided with an ornamental braid in accordance with the present preferred embodiment is the same as the method for producing a window glass for a vehicle provided with an ornamental braid in accordance with the first preferred embodiment.

The molten resin 9 injected into the cavity 8 fills the hollow 12 to provide the resin frame 10 with a projection 13. The projection 13 engages the hollow 12 to firmly integrate the resin frame 10 with the ornamental braid connection member 3. Thus, the durability of the aligned connection between the ornamental braid 2 and the ornamental braid 2' is enhanced.

A method for producing a window glass for a vehicle provided with an ornamental braid in accordance with a third preferred embodiment of the present invention will be described in detail.

Figure 4:
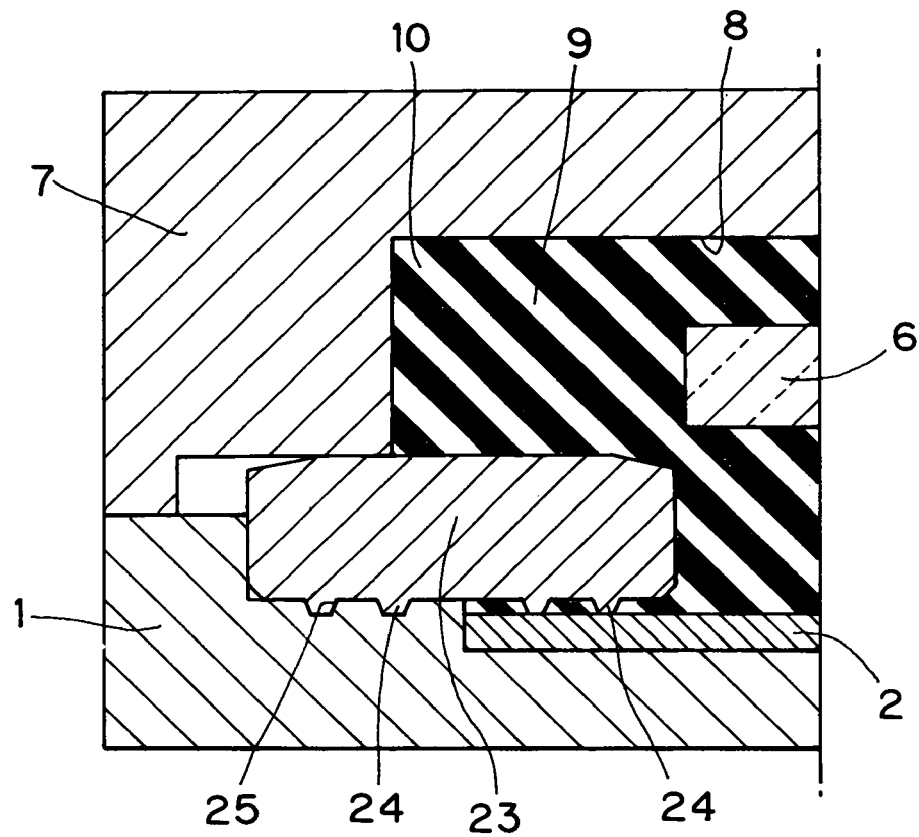
FIG. 4 is a sectional view of a mold of an injection molding machine explaining a method for producing a window glass for a vehicle provided with an ornamental braid in accordance with a third preferred embodiment of the present invention.

As shown in FIG. 4, a plurality of projections 24 formed on an ornamental braid connection member 23 of substantially rectangular parallelopiped shape engage a plurality of hollows 25 formed on the lower mold 1 to fix the ornamental braid connection member 23 on the lower mold 1 and clamp the ornamental braid 2 with the projections 24 and the lower mold 1, thereby fixing the ornamental braid 2 on the lower mold 1. Except for the fact that the ornamental braid connection member 23 is used instead of the ornamental braid connection member 3 and the pin 5 is not used, the method for producing a window glass for a vehicle provided with an ornamental braid in accordance with the present preferred embodiment is the same as the method for producing a window glass for a vehicle provided with an ornamental braid in accordance with the first preferred embodiment.

In the present preferred embodiment, the need for inserting the pin 5 into the lower mold 1 and the ornamental braid connection member 3 is eliminated. Thus, the method for producing a window glass for a vehicle provided with an ornamental braid is simplified. The molten resin 9 is charged into the space between the ornamental braid connection member 23 and the ornamental braid 2 to firmly integrate the ornamental braid connection member 23 with the ornamental braid 2. Thus, the durability of the aligned connection between the ornamental braid 2 and the ornamental braid 2' is enhanced. In this case, the ornamental braid 2' is desirably provided with hollows for engaging the projections 24 to enhance the durability of the connection between the ornamental braid connection member 23 and the ornamental braid 2'.

Figure 5:
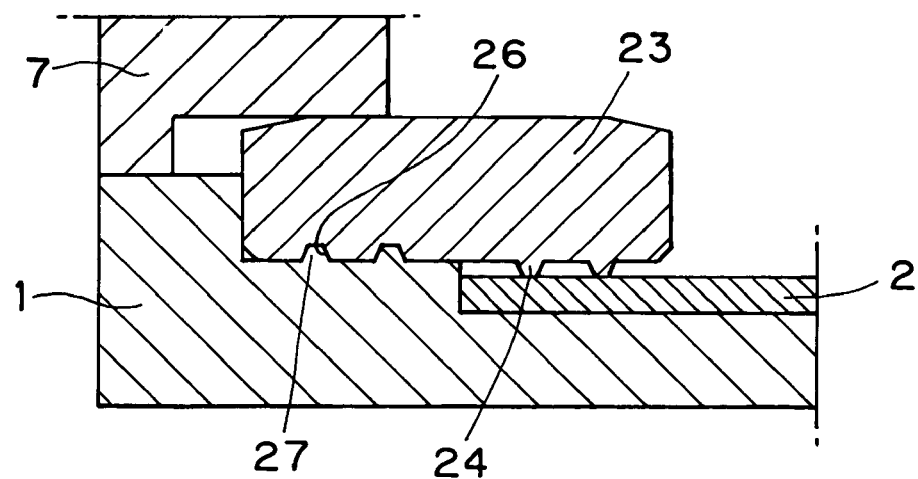
FIG. 5 is a sectional view of a mold of an injection molding machine explaining a method for producing a window glass for a vehicle provided with an ornamental braid in accordance with another preferred embodiment of the present invention.

As shown in FIG. 5, it is alternatively possible to engage a plurality of hollows 26 formed on the ornamental braid connection member 23 with a plurality of projections 27 formed on the lower mold 1 to fix the ornamental braid connection member 23 on the lower mold 1. In this case, the ornamental braid 2' is desirably provided with projections for engaging the hollows 26 to enhance the durability of the connection between the ornamental braid connection member 23 and the ornamental braid 2'.

The ornamental braid connection members 3, 23 can be fixed to the lower mold 1 with pressure sensitive adhesive double coated tapes, magnetic force, etc.

The ornamental braid 2 can be made of resin or metal.

The molten resin 9 injected into the cavity 8 can be PVC(polyvinyl chloride), copolymer made of vinyl chloride and ethylene, polyolefine elastomer, polyester elastomer, polyurethane elastomer, other kinds of rubber materials, etc.

The ornamental braid connection members 3, 23 can be made of iron, stainless steel, aluminum, aluminum alloy, rigid resin, etc.

While the present invention has been described with reference to preferred embodiments, one of ordinary skill in the art will recognize that modifications and improvements may be made while remaining within the spirit and scope of the present invention. The scope of the invention is determined solely by the attached claims.

The invention claimed is:

1. A method for producing a window glass for a vehicle provided with an ornamental braid, comprising the steps of:
    setting an ornamental braid comprising a channel-shaped cross section on a lower mold of an injection molding machine with an open end of the ornamental braid facing upwords,
    setting an ornamental braid connection member of rectangular parallelopiped shape on the lower mold, with one end portion of the connection member fitted in an end portion of the ornamental braid,
    setting a glass plate on the lower mold,
    closing an upper mold, thereby locking the molds, and
    injecting molten resin into a cavity formed between the lower mold and the upper mold, thereby molding a resin frame integrally with, the ornamental braid and the ornamental braid connection member, with the connection member projecting from the end portion of the ornamental braid.

2. A method for producing a window glass for a vehicle provided with an ornamental braid of claim 1, further comprising a step of clamping the ornamental braid with the ornamental braid connection member and the lower mold, thereby fixing the ornamental braid on the lower mold.

3. A method for producing a window glass for a vehicle provided with an ornamental braid of claim 1, further comprising a step of clamping the ornamental braid with a plurality of projections formed on the ornamental braid connection member and the lower mold, thereby fixing the ornamental braid on the lower mold.

4. A method for producing a window glass for a vehicle provided with an ornamental braid of claim 1, further comprising a step of inserting a pin projecting from the lower mold into a hole formed in the ornamental braid connection member, thereby fixing the ornamental braid connection member on the lower mold.

5. A method for producing a window glass for a vehicle provided with an ornamental braid of claim 1, further comprising a step of engaging a plurality of projections formed on the ornamental braid connection member with a plurality of hollows formed on the lower mold, thereby fixing the ornamental braid connection member on the lower mold.

6. A method for producing a window glass for a vehicle provided with an ornamental braid of claim 1, further comprising a step of engaging a plurality of hollows formed on the ornamental braid connection member with a plurality of projections formed on the lower mold, thereby fixing the ornamental braid connection member on the lower mold.

7. A method for producing a window glass for a vehicle provided with an ornamental braid of claim 1, wherein the ornamental braid connection member is provided with a hollow for engaging the resin frame.

* * * * *